United States Patent [19]

Fasching

[11] 4,213,184
[45] Jul. 15, 1980

[54] SIGNAL PROCESSOR FOR PROCESSING ULTRASONIC RECEIVER SIGNALS

[75] Inventor: George E. Fasching, Morgantown, W. Va.

[73] Assignee: The United States of America as represented by the United States Department of Energy, Washington, D.C.

[21] Appl. No.: 949,598

[22] Filed: Oct. 10, 1978

[51] Int. Cl.² ............................ G06G 7/18; G06J 1/00
[52] U.S. Cl. ...................................... 364/574; 73/613; 364/605; 364/811
[58] Field of Search ............... 364/574, 575, 602, 605, 364/811, 829, 832, 734; 328/127, 151; 73/596, 612, 613

[56] References Cited

U.S. PATENT DOCUMENTS

| 3,484,591 | 12/1969 | Trimble | 364/574 |
| 3,750,036 | 7/1973 | Burrows et al. | 328/151 |
| 3,937,943 | 2/1976 | Debrunner et al. | 364/575 |
| 3,982,241 | 9/1976 | Lipcon | 328/151 |
| 4,050,025 | 9/1977 | Gerber | 364/575 |

FOREIGN PATENT DOCUMENTS 855866 11/1970 Canada .................................. 364/574

*Primary Examiner*—Felix D. Gruber
*Attorney, Agent, or Firm*—R. V. Lupo; Stephen D. Hamel

[57] ABSTRACT

A signal processor is provided which uses an analog integrating circuit in conjunction with a set of digital counters controlled by a precision clock for sampling timing to provide an improved presentation of an ultrasonic transmitter/receiver signal. The signal is sampled relative to the transmitter trigger signal timing at precise times, the selected number of samples are integrated and the integrated samples are transferred and held for recording on a strip chart recorder or converted to digital form for storage. By integrating multiple samples taken at precisely the same time with respect to the trigger for the ultrasonic transmitter, random noise, which is contained in the ultrasonic receiver signal, is reduced relative to the desired useful signal.

7 Claims, 2 Drawing Figures

4,213,184

SIGNAL PROCESSOR FOR PROCESSING ULTRASONIC RECEIVER SIGNALS

BACKGROUND OF THE INVENTION

This invention relates generally to signal processing circuits and, more specifically, to an ultrasonic signal processor for improved presentation of an receiver signal.

In the art of ultrasonic testing, especially methods for testing rock core samples, the sound wave characteristics of a core sample provides a measure for its permeability to the flow of oil as well as other useful properties which are very important to the petroleum industry for core evaluation.

Normally, it has been the practice to utilize an oscilloscope to record the signal. It is very difficult to obtain accurate measurements of the signal due to random noise. Thus, there is a need for an signal processor which may be used to enhance an ultrasonic receiver signal.

SUMMARY OF THE INVENTION

In view of the above need, it is an object of this invention to provide an signal processor with improved presentation and recording of an ultrasonic receiver signal, whereby more accurate measurements of the signal may be easily obtained.

Another object of the invention is to provide an signal processor as in the above object wherein the signal is repeatedly sampled at precisely the same time relative to a reference trigger pulse timing for a selected number of samplings under control of a digital timing circuit and the samples are integrated to remove the signal noise. The integrated samples are transferred to a recording means for later reconstruction of the signal on a point by point basis or plotted directly on a strip chart recorder.

Other objects and many of the attendant advantages of the invention will be obvious from the following detailed description taken in conjunction with the drawings.

DETAILED DESCRIPTION

Figure 1:
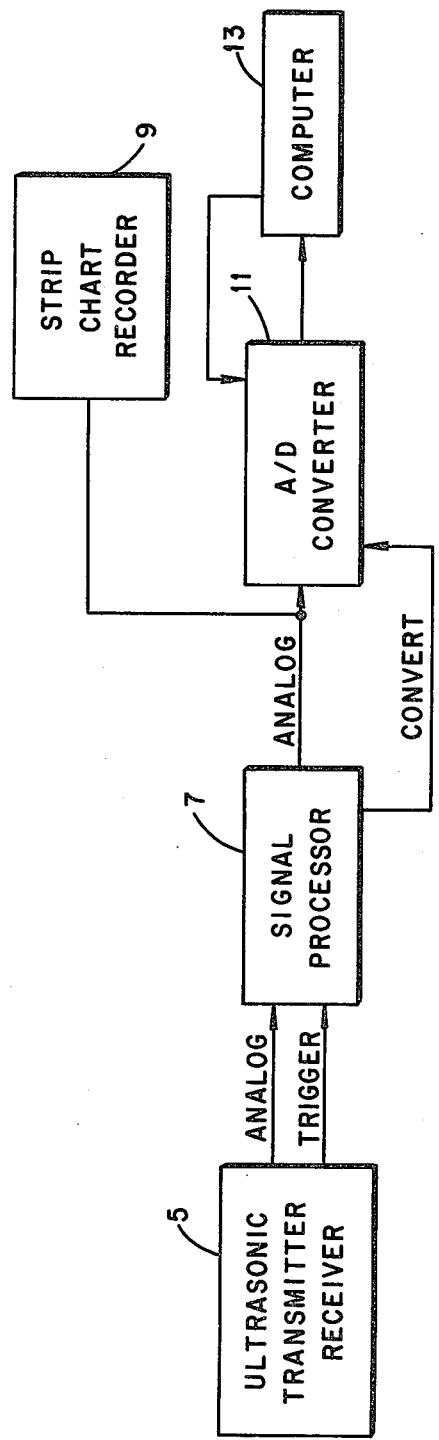
FIG. 1 is a general block diagram of an ultrasonic testing system in which the signal processor of the present invention may be employed.

Referring now to FIG. 1, the invention will be described in conjunction with a conventional ultrasonic transmitter/receiver 5. The noisy receiver analog signal output is connected to an analog signal input of the signal processor 7. The transmitter trigger pulse output is connected to a trigger input of the processor 7 and is used to synchronize the sampling operation timing of the processor, as will be explained hereinbelow. The analog signal output of the processor 7 may be connected to various types of recording devices, as illustrated here. It may be connected directly to a strip chart recorder 9 or to an A/D converter 11 which uses a convert command output of the processor to convert the analog signals to digital values for direct processing or storage of the waveform data in a digital computer 13. In the later case, the data may be stored and later recalled to construct the processed waveform.

Figure 2:
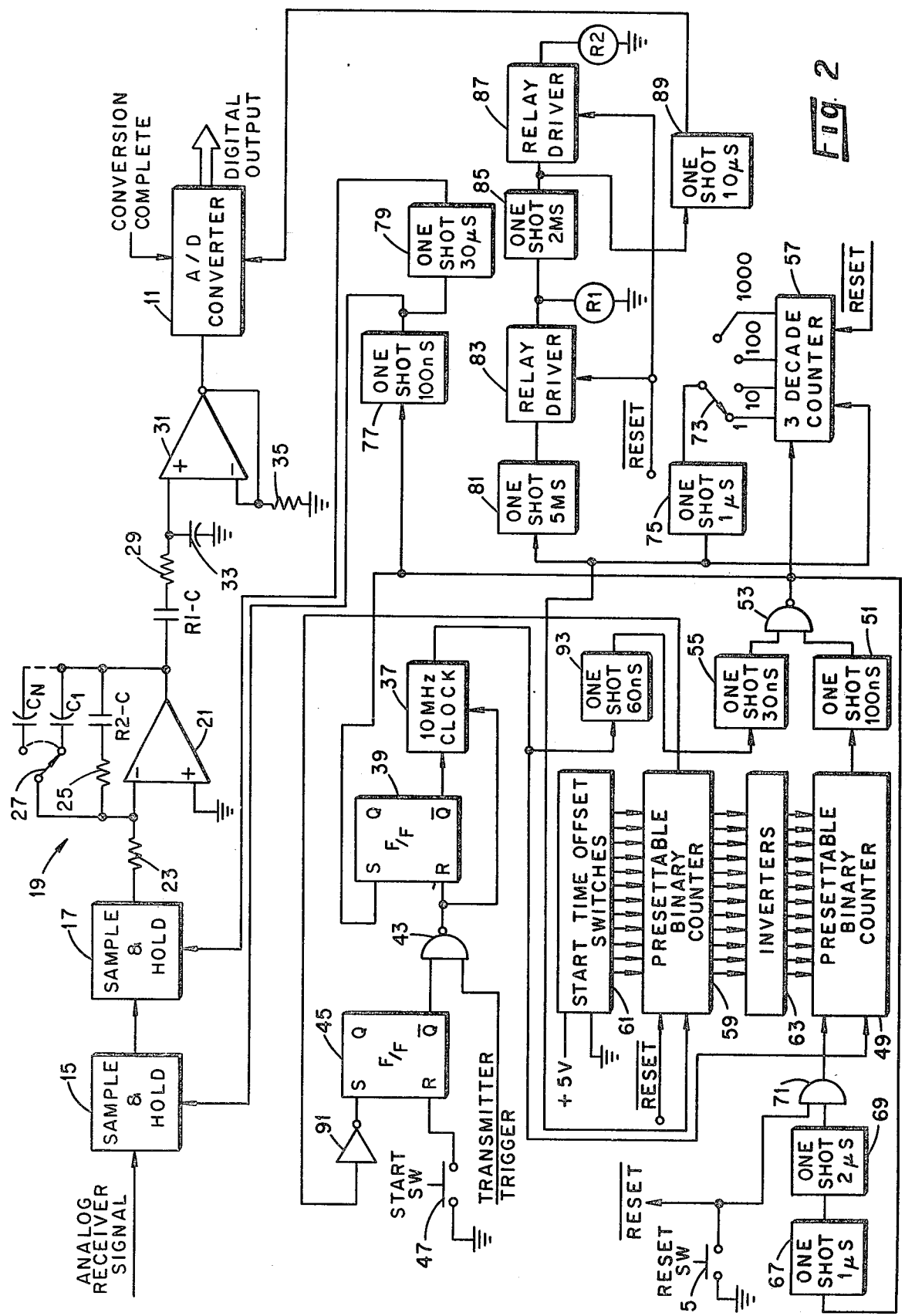
FIG. 2 is a detailed block diagram of the signal processor shown in single block form in FIG. 1.

Referring now to FIG. 2, the processor 7 is shown in detail together with the A/D converter 11. The noisy analog signal from the receiver is fed to the input of a first sample and hold circuit 15. The output of sample and hold 15 is connected to the input of a second sample and hold circuit 17. The timing circuit is designed so that the first sample and hold extracts a 100 nsec sample on command to the sample command input. Sample and hold 17 begins to extract a 30 microsecond sample at the end of the 100 nsec sample of sample and hold 15 by a separate command to its sample command input. The second sample and hold (17) has a much larger storage capacitor than does the first sample and hold (15) so that the droop in the output of the second sample and hold is less than 1/100 that of the first sample and hold. By using the two sample and hold circuits the acquisition of the input signal is very rapid (100 nsec) but yet the droop is minimized. A large droop in the sample signal causes excessive nonlinearity in the following integrator 19 response when the hold period is of the order of 20 msec, which is the typical period of the transmitter pulses. During this period, the output of sample and hold 17 is integrated in integrator 19 connected to the output of sample and hold 17.

The integrator 19 consists of an operational amplifier 21 which has its inverting input (−) connected through a resistor 23 to the output of sample and hold 17 and its non-inverting input (+) connected to ground. The inverting input of amplifier 21 is connected through a resistor 25 in series with a pair of normally open relay contacts R2-C to the output thereof. In order to allow selection of the proper capacitance for the selected integration time constants so that the output of the integrator may be maintained at the same signal level for various selected sampling replications, a selector switch 27 is provided which has its common terminal connected to the inverting input of amplifier 21. A plurality of capacitors $C_1$ through $C_N$ are respectively connected between the selectable terminals of switch 27 and the output of amplifier 21. The output of amplifier 21 is connected through a set of normally open relay contacts R1-C and a series resistor 29 to the non-inverting (+) input of a buffer amplifier 31. A capacitor 33 is connected between the + input of amplifier 31 and ground.

In operation of the analog circuit, the digital timing control circuit, which is detailed hereinbelow, controls the signal sampling and discharging of the integrator 19. Relay contacts R2-C provide a means of discharging the selected integrating capacitor ($C_1$-$C_N$) prior to each integrating sequence. Resistor 25 serves to limit the discharge current, protecting contacts R2-C. Contacts R1-C are closed at the end of each integrating sequence and transfers the integral value to a holding circuit formed by resistor 29 and capacitor 33. The non-inverting amplifier 31 with the feedback resistor 35 provides a high input impedance buffer for the output of this section which may be connected to the A/D converter 11 and/or to the strip chart recorder as shown in FIG. 1. The converter 11 is triggered by the timing circuit to convert the integrated signal 2 ms after contacts R1-C are closed. After the integrated signal readout is complete, contacts R1-C open and contact R2-C close, thereby resetting the integrator 19 for the next integrating sequence.

Turning now to the digital timing circuit which forms the remainder of FIG. 2, precision timing for the samping operation is controlled by the precision 10 MHz clock 37. The clock 37 may take various forms to produce the 10 MHz timing signal. In this embodiment it consists of an 80 MHz crystal controlled oscillator and three stages of binary counters with conventional gating to divide the 80 MHz signal to obtain a 10 MHz square wave at the output of the clock when the $\overline{Q}$ output of R-S flip-flop 39 connected to the gating input of clock 37, is high (logic one). The clock counters are reset between clock operations to maintain consistent timing of the clock pulses with respect to the clock gate turn-on-time.

An integrating sequence is initiated by the transmitter trigger line connected to the input of a NAND gate 43. An R-S flip-flop 45 is used to control gate 43 by connecting the $\overline{Q}$ output to the second input of gate 43. The reset (R) input of flip-flop 45 is connected to ground through a start switch 47 which when depressed resets flip-flop 45 causing the $\overline{Q}$ output to go high (logic one), thereby enabling gate 43. The transmitter trigger pulse causes the output of gate 43 to go low (logic zero) resetting flip-flop 39. The reset output $\overline{Q}$ of flip-flop 39 goes high enabling the clock 37. The clock counters are reset by connecting the output of gate 43 to the clock reset input.

The clock 37 output is connected to the count input of a forward counting presettable binary counter 49. Counter 49 is a twelve-stage counter and controls the analog signal sample timing. Each time the counter 49 counts through zero it delivers a negative going count overflow pulse at an output which is connected to the input of a one-shot 51. The output of one-shot 51 is connected to one input of a NAND gate 53. The output of clock 37 is connected through one-shot 93 and one-shot 55 to the other input of NAND gate 53. One-shots 93 and 55 synchronize the sampling of the analog input signal with MHz clock. The propagation delay through counter 49 varies from 0 to 50 nsec. The output of NAND gate 53 is connected to the count input of a 3-decade binary coded decimal (BCD) counter 57. The output of one-shot 51 goes high for 100 nsec when the counter 49 output goes low and the output of one-shot 55 is high for 30 nsec following a 60 nsec delay after the clock pulse which counts counter 49 through zero. This causes the output of gate 53 to go low triggering a count to the input of counter 57. Counter 57 is forward counting and used to count a selected number of replications of the sample taken at a given time relative to the ultrasonic transmitter trigger signal.

The number preset in counter 49 determines the time from the transmitter trigger pulse that the analog receiver signal is sampled. The time for the first sampling point is determined by the number preset in a second presettable counter 59. The operator selects the time for the first sample point by means of a bank of twelve binary coded switches. The switches are connected respectively to the 12 preset inputs of the 12-stage binary counter 59 to preset the counter at the desired starting point relative to the transmitter trigger which starts the clock pulse train. The counter 59 is preset to the selected offset value, a "zero" if the respective switch to the counter stage is commonly connected or a "one" if the switch if +5V connected when the $\overline{RESET}$ line goes "low". The offset time switches may be used to eliminate unwanted leading portions of the receiver signal. The binary complement of the offset value is supplied to the preset inputs of counter 49 by means of a bank of corresponding stage-connected inverters 63.

To preset counters 49 and 59 initially, a reset switch 65 is provided which when depressed momentarily places a "low" on the $\overline{RESET}$ line connected to the preset control inputs of counters 49 and 59. The $\overline{RESET}$ line also connects to various points in the circuit, as indicated, which must be initially reset or cleared prior to the initial transmitter trigger pulse. When the counter 49 is counted to overflow, the output of gate 53 triggers a time delay one-shot 67 connected to the gate 53 output. The output of one-shot 67 is connected to the input of another one-shot 69 whose output goes "low" for 2 microseconds when one-shot 67 times out. The output of one-shot 69 is connected to one input of an AND gate 71 which has its other input connected to the $\overline{RESET}$ line. The output of gate 71 is connected to the preset input of counter 49. A "low" on either input of gate 71 causes the output to go low, presetting counter 49 to the complement of the value registered in counter 59. Thus, counter 49 is initially loaded by the initial reset and is subsequently reloaded, once each counting period of counter 49, following a time delay to allow advance of counter 59 if a new integrating sequence is to begin.

The number of times the analog receiver signals are sampled at a point relative to the transmitter trigger pulse may be selected by means of a selector switch 73 which has the selected terminals connected to respective stages of the replications counter 57 which are "high" at the selected count. In this embodiment, the selectable sampling counts are 1, 10, 100, and 1000. The common terminal of switch 73 is connected to the input of 1 microsecond one-shot 75. The output of one-shot 75 is connected to the clear input of counter 57 and to the count input of counter 59. Thus, when the selected number of sampling replications for a point of the analog receiver signal is completed, the counter 57 is reset and the counter 59 is advanced one count to sample the next point of the signal.

The sample and hold circuits 15 and 17 are triggered by means of one-shots 77 and 79, respectively. One-shot 77 is connected to the output of NAND gate 53 and has its output connected to the trigger input of sample and hold 15. One-shot 79 is connected to the output of one-shot 77 and has its output connected to the trigger input of sample and hold 17. Thus, each time the counter 49 is counted through "zero" during the integrating sequence, one-shot 77 triggers sample and hold 15 to sample the input analog signal for 0.1 microsecond. When one-shot 77 times out, the output goes "low", one-shot 79 triggers sample and hold 17 to sample the signal held by sample and hold 15 for 30 microseconds. This action provides the timing for the sampling procedure explained above.

At the end of each integrating period, relays R1 and R2 are activated sequentially to transfer the integrated sample to the A/D converter 11 and the integrator 19 is reset by closing the corresponding relay contacts R1-C and R2-C, respectively. The pulse at the output of one-shot 75, which is connected to the input of a one-shot 81, activates relay R1 through a relay driver 83 connected to the output of one-shot 81. The output of relay driver 83 is connected to relay R1 and to the input of a one-shot 85. The output of one-shot 85 is connected to the input of a relay driver 87 which controls relay R2 connected to the output thereof. Thus, relay R1 is activated for 5 milliseconds, the period of one-shot 81, closing contacts R1-C to transfer the integrated signal to the input of A/D converter 11 through the buffer amplifier 31. When one-shot 81 times out, relay contacts R1-C opens again and one-shot 85 is triggered. This activates R2, thereby closing contacts R2-C to discharge the integrator 19 for 2 msec, the period of one-shot 85.

Following the time the contacts R1-C are closed, the A/D converter is triggered to convert the analog signal applied to its input. The output terminal of one-shot 85 is connected to the input of a 10-microsecond one-shot 89 whose output is connected to the convert command input of A/D converter 11. Thus, after one-shot 85 times out it triggers one-shot 89 signaling it to convert the analog value from the integrator which is being held by the holding circuit capacitor 33.

To complete the digital timing circuit functions, the output of gate 53 is connected to the set (S) input of flip-flop 39. Flip-flop 39 is set following each count period of counter 49 turning the clock 31 off and subsequently reset by the transmitter trigger pulse to restart the clock. This ensures that the same point of the analog receiver signal is sampled relative to the trigger pulse time for the integrating sequence. When all of the points have been sampled, the counter 59 presents a "high" signal condition at an output which is connected through an inverter 91 to the set (S) input of flip-flop 45. This causes the $\overline{Q}$ output of flip-flop 45 to go "low", thereby inhibiting the next transmitter trigger pulse to pass through gate 43 and the sampling operation is stopped.

The circuit is capable of sampling the analog receiver signal up to a maximum of 4,096 points, assuming no offsetting time is selected. The sampled points may be plotted directly or recorded for processing. Assuming there is no offset time, the first point will occur at from 160 to 172.5 nsec after the trigger pulse from the transmitter, if delay in the gating is neglected. The gating stages may contribute as much as 20 nsec fixed delay to the above initial point time range. The time between points on the plot scale is precisely 100 nsec; therefore, the time scale of the plot of a processed signal is 409.6 microseconds. The plot may be started at any one of the 4,096 points by setting the desired start time with the start time offset switches 61.

Thus, it will be seen that an improved signal processor has been provided which may be used with an ultrasonic transmitter/receiver to enhance the ultrasonic receiver output signal. Although the invention has been illustrated by means of a specific example, it will be obvious to those skilled in the art that various modifications and changes may be made therein without departing from the scope of the following claims.

What is claimed is:

1. A signal processor for processing the output signals from an ultrasonic receiver including an analog output signal and a reference trigger signal to reduce random noise contained in said signal relative to the desired useful signal, comprising:

means for repeatedly sampling said analog signal a selected number of sampling times in response to sample command signals applied thereto at each of a plurality of separate points in time of said analog singal relative to said reference trigger signal and temporarily holding the sample values;

an integrator connected to receive said sample values;

a recording means for separately recording the integral values of each of said plurality of separate points of sampling of said analog signal;

relay means for transferring integral values of said integrator to said recording means in response to a relay control signal; and timing control means operable in response to said reference trigger signal for generating and applying said sample command signals to said sampling means and generating said relay control signal applied to said relay means each time the selected number of samples of said plurality of separate points of sampling of said analog signal is completed.

2. The signal processor as set forth in claim 1 wherein said timing control means includes:

a clock pulse generator;

a first binary counter having a count input, a count overflow output and a plurality of stages for equivalent binary count capacity equal to said plurality of separate sampling points of said analog signal;

a second binary counter having a plurality of stages corresponding to said first counter, preset inputs, a preset control input, a count input connected to the output of said clock pulse generator and a count overflow output;

means responsive to the count overflow output of said second counter for generating and applying a delayed reset signal to said preset control input of said second counter;

a plurality of inverters separately connected between corresponding stages of said first counter and said preset inputs of said second counter so that each time a preset signal is applied to said preset input of said second counter the binary complement of the number registered by said first counter is preset into said second counter;

gating means responsive to said reference trigger signal for gating said clock pulse generator "on" and subsequently gating said clock "off" in response to a count overflow from said counter;

a replications counter for counting the overflow of said second counter and having a selectable count output for selecting the number of sample replications to said separate sampling points of said analog signal;

relay control means responsive to the selectable count output of said replications counter for generating said relay control signal and applying a count pulse to said count input of said first counter;

a sample command pulse generator means responsive to overflows of said second counter for generating and applying said sample command pulses to said sampling means; and switching means responsive to count overflows of said first counter for inhibiting the application of said reference trigger signal to said clock pulse generator, thereby ending the sampling operation.

3. The signal processor as set forth in claim 2 wherein said first binary counter is a presettable binary counter having preset inputs and a preset control input and said timing control means further includes means for selecting and applying a start time offset value to said preset inputs of said first counter and means for manually generating and applying a reset signal to said preset control input of said first counter, whereby selected initial portions of said analog signal may be eliminated from sampling according to the selected start time offset value.

4. The signal processor as set forth in claim 3 wherein said sampling means includes a first sample and hold circuit having an input connected to receive said analog signal, and a second sample and hold circuit connected to the output of said first sample and hold circuit and an output connected to the input of said integrator, each of said sample and hold circuits having a sample command input for receiving first and second sample command signals, respectively, and wherein said sample command pulse generator means includes a first one-shot connected to receive the count overflow signal from said second counter and having an output connected to said sample command input of said first sample and hold circuit, a second one-shot connected to the output of said first one-shot and having an output connected to said sample command input of said second sample and hold circuit, said second one-shot arranged to be triggered when said first one-shot times out and having a period substantially longer than said first one-shot so that said analog signal is first sampled during the period of said first one-shot and the sample taken by said first one-shot is subsequently sampled by said second sample and hold circuit for the period of said second one-shot, thereby minimizing droop in the sample signal applied to the input of said integrator.

5. The signal processor as set forth in claim 4 wherein said integrator further includes means for selecting the integration time constants of said integrator so that the output of the integrator may be maintained at the same level for various selected multiples of sample replications.

6. The signal processor as set forth in claim 5 wherein said recording means is a strip chart recorder.

7. The signal processor as set forth in claim 5 wherein said recording means is a digital recording means including an analog-to-digital converter and wherein said timing control means further includes means responsive to the selected count output of said replications counter for generating and applying a convert command to said converter following the period said relay control signal is generated.

* * * * *